(12) United States Patent
Nordbruch

(10) Patent No.: US 12,715,470 B2
(45) Date of Patent: Aug. 25, 2026

(54) METHOD FOR CARRYING OUT AN AT LEAST PARTLY AUTOMATED DRIVING FUNCTION UTILIZING INFRASTRUCTURE AS A CONTROL INPUT

(71) Applicant: Robert Bosch GmbH, Stuttgart (DE)

(72) Inventor: Stefan Nordbruch, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 255 days.

(21) Appl. No.: 18/175,632

(22) Filed: Feb. 28, 2023

(65) Prior Publication Data

US 2023/0294735 A1 Sep. 21, 2023

(30) Foreign Application Priority Data

Mar. 21, 2022 (DE) ..................... 10 2022 202 741.8

(51) Int. Cl.
*B60W 40/02* (2006.01)
*B60W 60/00* (2020.01)

(52) U.S. Cl.
CPC ........ *B60W 60/0015* (2020.02); *B60W 40/02* (2013.01); *B60W 2552/00* (2020.02); *B60W 2555/20* (2020.02); *B60W 2556/45* (2020.02)

(58) Field of Classification Search
CPC ............. B60W 60/0015; B60W 40/02; B60W 2552/00; B60W 2556/45; B60W 2555/20
See application file for complete search history.

(56) References Cited

U.S. PATENT DOCUMENTS 10,665,109 B1 * 5/2020 Simon .............. G08G 1/096791
2014/0365034 A1 * 12/2014 Schilling ............... B60W 50/00 701/2
2015/0211870 A1 * 7/2015 Nickolaou ............. G08G 1/166 701/28
2018/0240343 A1 * 8/2018 Nordbruch ............ B60W 30/09
2018/0252768 A1 * 9/2018 Rajski .............. G01R 31/31727
2019/0143968 A1 * 5/2019 Song ........................ G02B 7/02
2021/0078610 A1 * 3/2021 Schuller .......... B60W 60/00184
2021/0086766 A1 * 3/2021 Nordbruch ........ B60W 30/0956
(Continued)

FOREIGN PATENT DOCUMENTS

DE 102016212196 A1 1/2018
DE 102017204603 A1 9/2018
(Continued)

*Primary Examiner* — Scott A Browne
*Assistant Examiner* — Izcalli Rios-Aguirre
(74) *Attorney, Agent, or Firm* — Norton Rose Fulbright US LLP

(57) ABSTRACT

A method for carrying out an at least partly automated driving function provided by means of a motor vehicle. The method includes: determining that an infrastructure element is located in an environment of the motor vehicle, wherein the infrastructure element is part of an event chain for the at least partly automated guidance of a motor vehicle during a trip that is guided in an at least partly automated manner; determining a minimum safety integrity level that the event chain must have; determining which safety integrity level the event chain maximally fulfills; determining, based on the minimum safety integrity level and the maximum safety integrity level of the event chain, whether the driving function may be carried out; and carrying out the driving function.

10 Claims, 5 Drawing Sheets

(56) References Cited

U.S. PATENT DOCUMENTS

| | | | | |
|---|---|---|---|---|
| 2021/0088784 | A1* | 3/2021 | Whitmire | G02B 27/017 |
| 2022/0076565 | A1* | 3/2022 | Bartkowiak | H04W 4/46 |
| 2022/0126878 | A1* | 4/2022 | Moustafa | B60W 60/0013 |

FOREIGN PATENT DOCUMENTS

| | | | |
|---|---|---|---|
| DE | 102018200820 | A1 | 7/2019 |
| DE | 102019214420 | A1 | 3/2021 |

* cited by examiner 601
503
607
609
605
611
603
505
405
409
719
607
503
717
609
715
605
713
611
711
603
721
709
707
705
703
701
601

METHOD FOR CARRYING OUT AN AT LEAST PARTLY AUTOMATED DRIVING FUNCTION UTILIZING INFRASTRUCTURE AS A CONTROL INPUT

CROSS REFERENCE

The present application claims the benefit under 35 U.S.C. § 119 of German Patent Application No. DE 10 2022 202 741.8 filed on Mar. 21, 2022, which is expressly incorporated herein by reference in its entirety.

FIELD

The present invention relates to a method for carrying out an at least partly automated driving function provided by means of a motor vehicle, a device, a computer program and a machine-readable storage medium.

BACKGROUND INFORMATION

German Patent Application No. DE 10 2017 204 603 A1 describes a vehicle control system and a method for controlling a vehicle.

SUMMARY

An object of the present invention is to provide for safely carrying out an at least partly automated driving function provided by means of a motor vehicle.

This object may be achieved by features of the present invention. Advantageous example embodiments of the present invention are disclosed herein.

According to a first aspect of the present invention, a method for carrying out an at least partly automated driving function provided by means of a motor vehicle is provided. According to an example embodiment of the present invention, the method includes the following steps:

- Determining that an infrastructure element is located in an environment of the motor vehicle, which infrastructure element is configured to determine an infrastructure assistance datum for an infrastructure-based, at least partly automated guidance of a motor vehicle, wherein the infrastructure element is part of an event chain for the at least partly automated guidance of a motor vehicle during a trip that is guided in an at least partly automated manner;
- Determining a minimum safety integrity level that the event chain must have for the infrastructure assistance datum of the infrastructure element to be used by the motor vehicle to carry out the at least partly automated driving function;
- Determining which safety integrity level the event chain maximally fulfills;
- Determining, based on the minimum safety integrity level and the maximum safety integrity level of the event chain, whether the at least partly automated driving function may be carried out based on the infrastructure assistance datum of the infrastructure element;
- Carrying out the at least partly automated driving function based on the infrastructure assistance datum and depending on a result of the determination as to whether the at least partly automated driving function may be carried out based on the infrastructure assistance datum of the infrastructure element.

According to a second aspect of the present invention, a device is provided, which is configured to carry out all steps of the method according to the first aspect of the present invention.

According to a third aspect of the present invention, a computer program is provided, which comprises instructions that, when the computer program is executed by a computer, for example by the device according to the second aspect, cause said computer to carry out a method according to the first aspect of the present invention.

According to a fourth aspect of the present invention, a machine-readable storage medium is provided, on which the computer program according to the third aspect of the present invention is stored.

The present invention is based on and includes the knowledge that the above task may be achieved by testing whether an infrastructure assistance datum of an infrastructure element may be used for carrying out a partly automated driving function. Depending on this test, the at least partly automated driving function is carried out based on the infrastructure assistance datum. Thus, it can advantageously be ensured that the at least partly automated driving function can be carried out safely. This is because in the case of a positive test result, i.e., if the infrastructure assistance datum may be used for carrying out an at least partly automated driving function, it is thus determined that the infrastructure element can be trusted. For example, it may be determined that infrastructure assistance data generated or determined by means of the infrastructure element can be trusted to the extent that they may be used for carrying out an at least partly automated driving function.

For example, the information or signals provided by the infrastructure element are considered to be trustworthy if the above test had a positive result. This, for example, brings about the technical advantage that a risk to road users in the environment of the motor vehicle can be minimized or prevented. In particular, this can advantageously ensure that a risk to the motor vehicle itself can be minimized or prevented.

It is thus provided that, before infrastructure assistance data of an infrastructure element is used for carrying out an at least partly automated driving function, it is tested whether this infrastructure assistance data may even be used for such carrying out. Depending on a result of this test, the at least partly automated driving function is then carried out. The at least partly automated driving function is then, for example, carried out based on the infrastructure assistance data of the infrastructure element or is, for example, not carried out.

This, in particular, brings about the technical advantage that a concept for safely carrying out an at least partly automated driving function provided by means of a motor vehicle is provided.

This, in particular, also brings about the technical advantage that the at least partly automated driving function can be carried out safely.

Within the meaning of the description, the German word "sicker" in particular means "safe" and "secure." While these two English terms are usually translated into German as "sicker," they have a partly different meaning in English.

The term "safe" is used in particular to refer to the topic of accidents and accident prevention. "Safe" thus, in particular, means that measures ensure the correct function of the event chain and that a correct flow of the method according to the first aspect is ensured.

The term "secure" is used in particular to refer to the topic of computer protection and hacker protection, i.e., in particular: How secure is the event chain and its parts, in particular components, against unauthorized access and against data manipulation by third parties, so-called hackers? An event chain that is "secure" thus, in particular, has adequate and sufficient computer protection and hacker protection.

In particular, the term "infrastructure-based assistance of a motor vehicle" means that one infrastructure assistance datum or several infrastructure data are provided to the motor vehicle. The motor vehicle can, for example, derive instructions for action based on the infrastructure assistance data. For example, based on the infrastructure assistance data, the motor vehicle itself can decide what to do.

An infrastructure assistance datum or infrastructure assistance data include, for example, one or more of the following data elements: control command for the at least partly automated control of a lateral and/or longitudinal guidance of the motor vehicle, remote control command for the at least partly automated driving functions, remote control of a lateral and/or longitudinal guidance of the motor vehicle, release command for releasing an at least partly automated driving functions, in particular fully automated, trip of the motor vehicle for a particular time in a particular area of an infrastructure, desired trajectory for the motor vehicle, target location, environmental data representing an environment of the motor vehicle, specification as to what the motor vehicle should do. The specification specifies, for example, whether the motor vehicle is, for example, permitted to drive or must stop, maximally allowed maximum speed, current signal aspect of a traffic light system, information indicated by means of an electronic traffic sign, in particular a dynamic traffic sign.

Carrying out the at least partly automated driving function in particular brings about at least partly automated guidance of the motor vehicle, which comprises at least partly automated control of a lateral and/or longitudinal guidance of the motor vehicle.

The phrase "at least partly automated guidance" includes one or more of the following cases: assisted guidance, partly automated guidance, highly automated guidance, fully automated guidance. The phrase "at least partly automated" thus includes one or more of the following phrases: assisted, partly automated, highly automated, fully automated. At least partly automated guidance of the motor vehicle thus comprises at least partly automated control of a lateral and/or longitudinal guidance of the motor vehicle.

Assisted guidance means that a driver of the motor vehicle permanently carries out either the lateral or the longitudinal guidance of the motor vehicle. The respectively other driving task (i.e., controlling the longitudinal or lateral guidance of the motor vehicle) is performed automatically. That is to say, in an assisted guidance of the motor vehicle, either the lateral guidance or the longitudinal guidance is controlled automatically.

Partly automated guidance means that in a specific situation (for example: driving on a highway, driving within a parking lot, overtaking an object, driving within a lane defined by lane markings) and/or for a certain period of time, longitudinal guidance and lateral guidance of the motor vehicle are automatically controlled. A driver of the motor vehicle does not have to manually control the longitudinal and lateral guidance of the motor vehicle. However, the driver must continually monitor the automatic control of the longitudinal and lateral guidance in order to be able to manually intervene if necessary. The driver must be ready at all times to fully take over motor vehicle guidance.

Highly automated guidance means that for a certain period of time, in a specific situation (for example: driving on a highway, driving within a parking lot, overtaking an object, driving within a lane defined by lane markings), longitudinal guidance and lateral guidance of the motor vehicle are controlled automatically. A driver of the motor vehicle does not have to manually control the longitudinal and lateral guidance of the motor vehicle. The driver does not have to continually monitor the automatic control of the longitudinal and lateral guidance in order to be able to intervene manually if necessary. If necessary, a take-over request is automatically issued to the driver to take over control of the longitudinal and lateral guidance, in particular issued with sufficient time to spare. The driver thus must potentially be able to take control of the longitudinal and lateral guidance. Limits of automatically controlling the lateral and longitudinal guidance are recognized automatically. In the case of highly automated guidance, it is not possible to automatically bring about a minimum-risk condition in every initial situation.

Fully automated guidance means that in a specific situation (for example: driving on a highway, driving within a parking lot, overtaking an object, driving within a lane defined by lane markings), longitudinal guidance and lateral guidance of the motor vehicle are controlled automatically. A driver of the motor vehicle does not have to manually control the longitudinal and lateral guidance of the motor vehicle. The driver does not have to monitor the automatic control of the longitudinal and lateral guidance in order to be able to intervene manually if necessary. Before ending the automatic control of the lateral and longitudinal guidance, the driver is automatically asked to take over the driving task (controlling the lateral and longitudinal guidance of the motor vehicle), in particular with a sufficient time to spare. If the driver does not take over the driving task, it is automatically returned to a minimum-risk condition. Limits of automatically controlling the lateral and longitudinal guidance are recognized automatically. In all situations, it is possible to automatically return to a minimum-risk system condition.

The terms "assist" and "support" may be used synonymously. The abbreviation "at least one" means "one or more."

In one example embodiment of the method of the present invention, it is provided that it is determined which safety integrity level each part of the event chain fulfills, wherein the maximum safety integrity level of the event chain is determined based on the respective safety integrity levels of the parts of the event chain. This, for example, brings about the technical advantage that the maximum safety integrity level of the event chain can be determined efficiently.

For example, it is determined that the maximum safety integrity level of the event chain is equal to the smallest safety integrity level of the parts of the event chain. The maximum safety integrity level corresponds to the smallest common denominator of the individual safety integrity levels of the parts of the event chain.

In one example embodiment of the method of the present invention, it is provided that vehicle-generated environmental signals representing an environment of the motor vehicle are received, wherein the infrastructure assistance datum is tested for correctness and/or for plausibility based on the vehicle-generated environmental signals, wherein the at least partly automated driving function is carried out based on a result of the test for correctness and/or plausibility.

This, for example, may bring about the technical advantage that the at least partly automated driving function can be carried out safely.

According to this example embodiment of the present invention, it is thus provided that prior to carrying out the at least partly automated driving function using the infrastructure assistance datum, said datum is tested for correctness and/or for plausibility by the on-board environment sensor system. This means that an on-board environment sensor system detects an environment of the motor vehicle and outputs environmental signals based on this detection. These vehicle-generated environmental signals are, for example, analyzed as to whether the infrastructure assistance datum is correct and/or plausible. If the infrastructure assistance datum is, for example, a signal with a traffic light system, which is an exemplary infrastructure element, the test for correctness can consist in processing the environmental signals in order to detect the signal aspect in the environment of the motor vehicle. When the signal aspect is detected, it is, for example, determined that the infrastructure assistance datum is correct.

In one example embodiment of the method of the present invention, it is provided that the safety integrity level comprises a SIL and/or an ASIL.

This, for example, may bring about the technical advantage that particularly suitable safety integrity levels can be used.

The abbreviation "ASIL" stands for the English term "Automotive Safety Integrity Level," which may be translated into German as "Automotive Sicherheitsintegritatslevel." The automotive safety integrity level is a key component of the ISO 26262 standard. ASIL distinguishes between four different ASIL risk levels denoted by ASIL-A, ASIL-B, ASIL-C, and ASIL-D.

The abbreviation "SIL" stands for the English term "Safety Integrity Level," which may be translated into German as "Sicherheitsintegritatslevel." The safety integrity level is a key component of the IEC EN 61508 standard. SIL distinguishes between four different SIL risk levels denoted by SIL-1, SIL-2, SIL-3, and SIL-4.

In one example embodiment of the method of the present invention, it is provided that the at least partly automated driving function can be carried out according to a restricted range of functions and according to an unrestricted range of functions, wherein, depending on a result of the determination as to whether the at least partly automated driving function may be carried out based on the infrastructure assistance datum of the infrastructure element, the restricted or the unrestricted range of functions is selected so that the at least partly automated driving function is carried out according to the selected range of functions.

This, for example, may bring about the technical advantage that a trip of the motor vehicle guided in an at least partly automated manner is thus still possible, albeit with a smaller range of functions. This means, for example, that the motor vehicle drives at a lower speed and/or maintains a greater distance to a road user ahead when carrying out the at least partly automated driving function according to a restricted range of functions compared to an unrestricted range of functions.

In one example embodiment of the method of the present invention, it is provided that the driving function is an element selected from the following group of driving functions: emergency braking function, ESP function, ABS function, AVP function.

This, for example, may bring about the technical advantage that particularly suitable driving functions can be provided.

The abbreviation "ESP" stands for "Electronic Stability Program." The abbreviation "ABS" stands for "Antilock Braking System." The abbreviation "AVP" stands for "Automated Valet Parking," which can be translated into German as "automatischer Parkservice."

An AVP operation comprises, for example, at least partly automated driving of the motor vehicle from a drop-off position of a parking lot, where a driver can drop off their motor vehicle for such an AVP operation, to a parking position of the parking lot and at least partly automated parking of the motor vehicle at the parking position. An AVP operation comprises, for example, at least partly automated maneuvering of the motor vehicle out of the parking position and at least partly automated driving of the motor vehicle from the parking position to a pick-up position of the parking lot, where the driver can pick up their motor vehicle again. The pick-up position and the drop-off position may, for example, be identical or may, for example, be different.

In one example embodiment of the method of the present invention, it is provided that the determination as to whether the at least partly automated driving function may be carried out based on the infrastructure assistance datum of the infrastructure element is performed depending on a current situation and/or on current weather and/or on a current time and/or on a current date and/or depending on a vehicle type of the motor vehicle and/or depending on an infrastructure type of the infrastructure and/or depending on the driving function.

This, for example, may bring about the technical advantage that the determination as to whether the at least partly automated driving function may be carried out based on the infrastructure assistance datum of the infrastructure element can be performed efficiently.

For example, it is provided that the minimum safety integrity level and/or a respective safety integrity level of parts or components of the event chain is selected depending on the current situation and/or on current weather and/or on the current time and/or on the current date and/or depending on the vehicle type of the motor vehicle and/or depending on the infrastructure type of the infrastructure and/or depending on the driving function.

For example, in rain or snow, visibility of a video camera may be limited so that the minimum safety integrity level is greater in such a case than in no rain or snow. It is thus, for example, required in rain or snow that the safety integrity level of a video camera is greater than in no rain or snow, which is then reflected in a correspondingly higher minimum safety integrity level of the event chain. Analogously, this may apply to other components of the event chain, in general to environment sensors of the event chain.

In one example embodiment of the method of the present invention, it is provided that the infrastructure element is an element selected from the following group of infrastructure elements: traffic light system, electronic traffic sign, in particular dynamic traffic sign.

This, for example, brings about the technical advantage that particularly suitable infrastructure elements can be used.

The terms "part" and "component" may be used synonymously.

The event chain in each case comprises, for example, the following as parts or as components: vehicle environment sensor system, infrastructure environment sensor system, environment sensor of the motor vehicle and/or of the infrastructure, computer, communication interface, cloud infrastructure, control unit. A communication link between two parts of the event chain is also defined as a part of the event chain.

The environment sensor system of the infrastructure, also referred to as infrastructure environment sensor system, comprises, according to one embodiment, one or more environment sensors arranged spatially distributed within the infrastructure.

The environment sensor system of the motor vehicle, also referred to as vehicle environment sensor system, comprises, according to one embodiment, one or more environment sensors comprised by the motor vehicle.

Environment sensors are, for example, different or are, for example, identical.

An environment sensor is, for example, one of the following environment sensors: radar sensor, ultrasonic sensor, LIDAR sensor, magnetic field sensor, infrared sensor, image sensor, in particular image sensor of a video camera.

The embodiments of the present invention described herein may be combined with one another in any manner, even if this is not explicitly described.

In one example embodiment of the present invention, the event chain is partially implemented in an infrastructure and is partially implemented in the motor vehicle. This, for example, brings about the technical advantage that the event chain can be implemented efficiently.

In one example embodiment of the method of the present invention, a part or a component of the event chain is an on-board component or is an infrastructure component or on-board part or infrastructure part.

The event chain may thus, for example, comprise a first event chain and a second event chain. The first event chain is, for example, implemented in the infrastructure and the second event chain is, for example, implemented in the motor vehicle.

According to one example embodiment of the present invention, it is provided that the method according to the first aspect is a computer-implemented method.

This, for example, brings about the technical advantage that the method can be implemented efficiently.

Statements made in connection with an infrastructure assistance datum apply analogously to several infrastructure assistance data, and vice versa. This means that the term "infrastructure assistance datum" always implies the plural, and vice versa.

Exemplary embodiments of the present invention are illustrated in the figures and are explained in more detail in the following description.

In the following, the same reference signs can be used for the same features.

DETAILED DESCRIPTION OF EXAMPLE EMBODIMENTS

Figure 1:
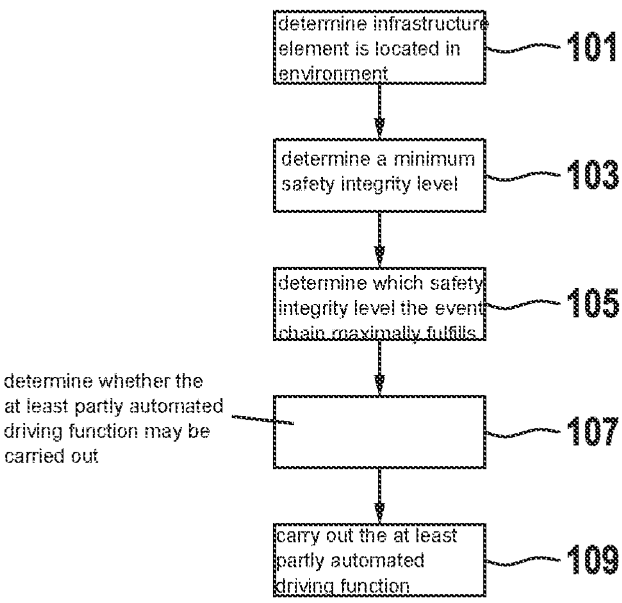
FIG. 1 shows a flow chart of a method according to the first aspect of the present invention.

FIG. 1 shows a flow chart of a method for carrying out an at least partly automated driving function provided by means of a motor vehicle, comprising the following steps:

Determining 101 that an infrastructure element is located in an environment of the motor vehicle, which infrastructure element is configured to determine an infrastructure assistance datum for an infrastructure-based, at least partly automated guidance of a motor vehicle, wherein the infrastructure element is part of an event chain for the at least partly automated guidance of a motor vehicle during a trip that is guided in an at least partly automated manner;

Determining 103 a minimum safety integrity level that the event chain must have for the infrastructure assistance datum of the infrastructure element to be used by the motor vehicle to carry out the at least partly automated driving function;

Determining 105 which safety integrity level the event chain maximally fulfills;

Determining 107, based on the minimum safety integrity level and the maximum safety integrity level of the event chain, whether the at least partly automated driving function may be carried out based on the infrastructure assistance datum of the infrastructure element;

Carrying out 109 the at least partly automated driving function based on the infrastructure assistance datum and depending on a result of the determination as to whether the at least partly automated driving function may be carried out based on the infrastructure assistance datum of the infrastructure element.

Figure 2:
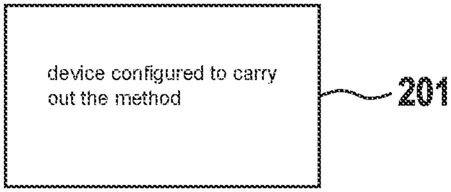
FIG. 2 shows a device according to the second aspect of the present invention.

FIG. 2 shows a device 201, which is configured to carry out all steps of the method according to the first aspect.

Figure 3:
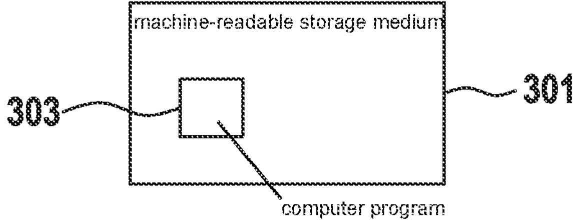
FIG. 3 shows a machine-readable storage medium according to the fourth aspect of the present invention.

FIG. 3 shows a machine-readable storage medium 301, in which a computer program 303 is stored. The computer program 303 comprises instructions that, when the computer program 303 is executed by a computer, cause the latter to carry out a method according to the first aspect.

Figure 4:
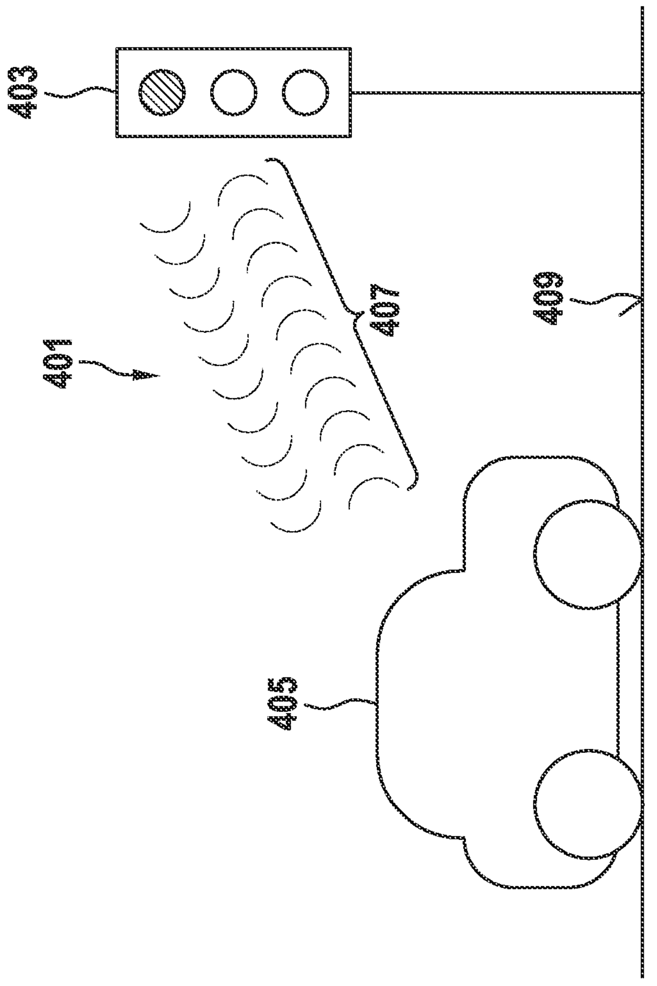
FIG. 4 shows a first event chain for the at least partly automated guidance of a motor vehicle, according to an example embodiment of the present invention.

FIG. 4 shows a first event chain 401 for the at least partly automated guidance of a motor vehicle.

The first event chain 401 comprises a traffic light system 403 and a motor vehicle 405. The motor vehicle 405 and the traffic light system 403 can wirelessly communicate with one another via a communication link 407. For example, the traffic light system 403 may wirelessly transmit a current and/or future signal aspect to the motor vehicle 405.

Such a signal aspect is an example of an infrastructure assistance datum. The traffic light system 403 is an example of an infrastructure element. The motor vehicle 405 drives on a road 409.

Before such an infrastructure assistance datum is trusted by the motor vehicle to be used for carrying out an at least partly automated driving function, it is tested according to the concept described herein whether this infrastructure assistance datum may be used for carrying out the at least partly automated driving function. How this is performed in detail is described above and/or below. In particular, reference is made to the following statements in connection with FIG. 7.

Figure 5:
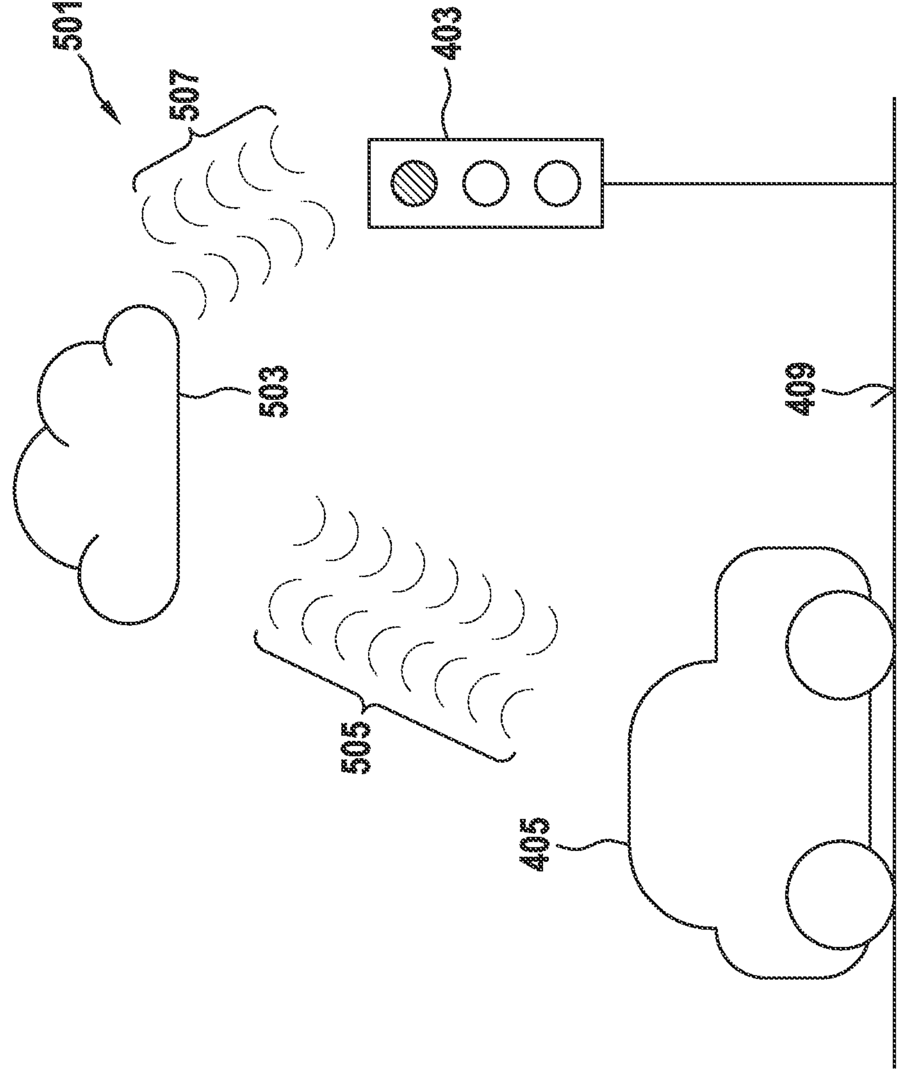
FIG. 5 shows a second event chain for the at least partly automated guidance of a motor vehicle, according to an example embodiment of the present invention.

FIG. 5 shows a second event chain 501 for the at least partly automated guidance of a motor vehicle 405.

The second event chain 501 comprises the traffic light system 403, the motor vehicle 405, and a cloud infrastructure 503. According to the exemplary embodiment shown in FIG. 5, the traffic light system 403 does not communicate directly with the motor vehicle 405 but indirectly using the cloud infrastructure 503. This means that the motor vehicle 405 communicates with the cloud infrastructure 503 via a first communication link 505. The traffic light system 403 communicates with the cloud infrastructure 503 via a second communication link 507.

The signal aspect of the traffic light system 403 can thus be transmitted via the second communication link 507 to the cloud infrastructure 503. The latter in turn can transmit the signal aspect via the first communication link 505 to the motor vehicle 405.

In an embodiment not shown, in addition to the indirect communication via the cloud infrastructure 503, it may be provided that the traffic light system 403, analogously to FIG. 4, transmits the infrastructure assistance datum directly to the motor vehicle 405.

Figure 6:
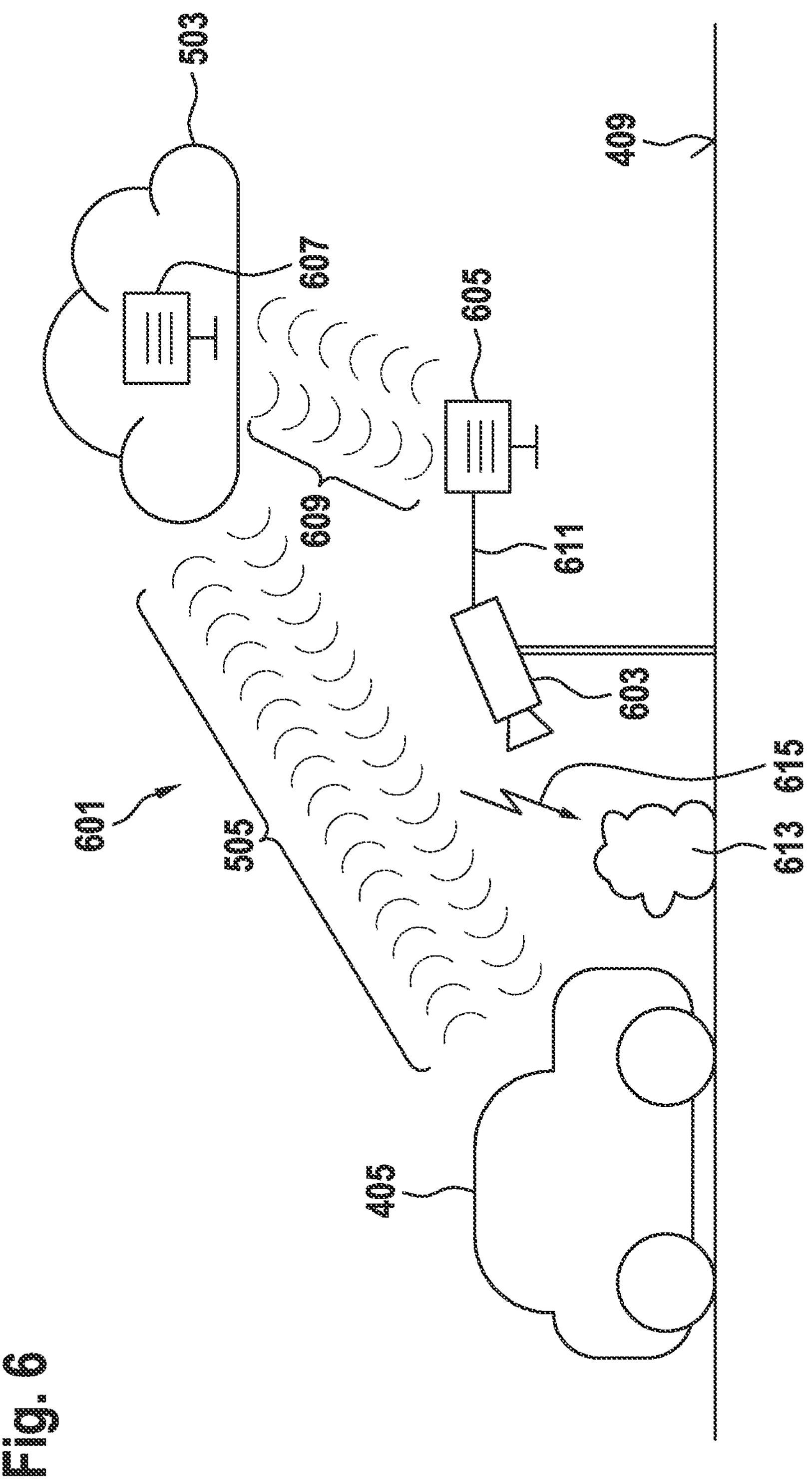
FIG. 6 shows a third event chain for the at least partly automated guidance of a motor vehicle, according to an example embodiment of the present invention.

FIG. 6 shows a third event chain 601 for the at least partly automated guidance of a motor vehicle.

The third event chain 601 comprises the motor vehicle 405, the cloud infrastructure 503, a video camera 603 comprising an image sensor (not shown), wherein the video camera 603 is arranged on the road 409. The third event chain 601 furthermore comprises a first computer 605, which is likewise arranged locally on the road 409.

A second computer 607 is implemented or provided in the cloud infrastructure 503.

The first computer 605 communicates with the cloud infrastructure 503, i.e., in particular with the second computer 607, via a third communication link 609. The first computer 605 is connected to the video camera 603 via a fourth communication link 611.

The third event chain 601 thus comprises the following as components or as parts: motor vehicle 405, cloud infrastructure 503, first computer 605, second computer 607 and video camera 603 as well as the respective communications links between the individual components.

By way of example, an object 613 is shown in the direction of travel in front of the motor vehicle 405, which is located on the road 409. One requirement for at least partly automated guidance of the motor vehicle 405 is that the motor vehicle 405 can still brake in time before such an object 613. As a symbol that such an object 613 is relevant to a requirement for an at least partly automated driving function of the motor vehicle 405, a lightning symbol with reference sign 615 is shown.

Figure 7:
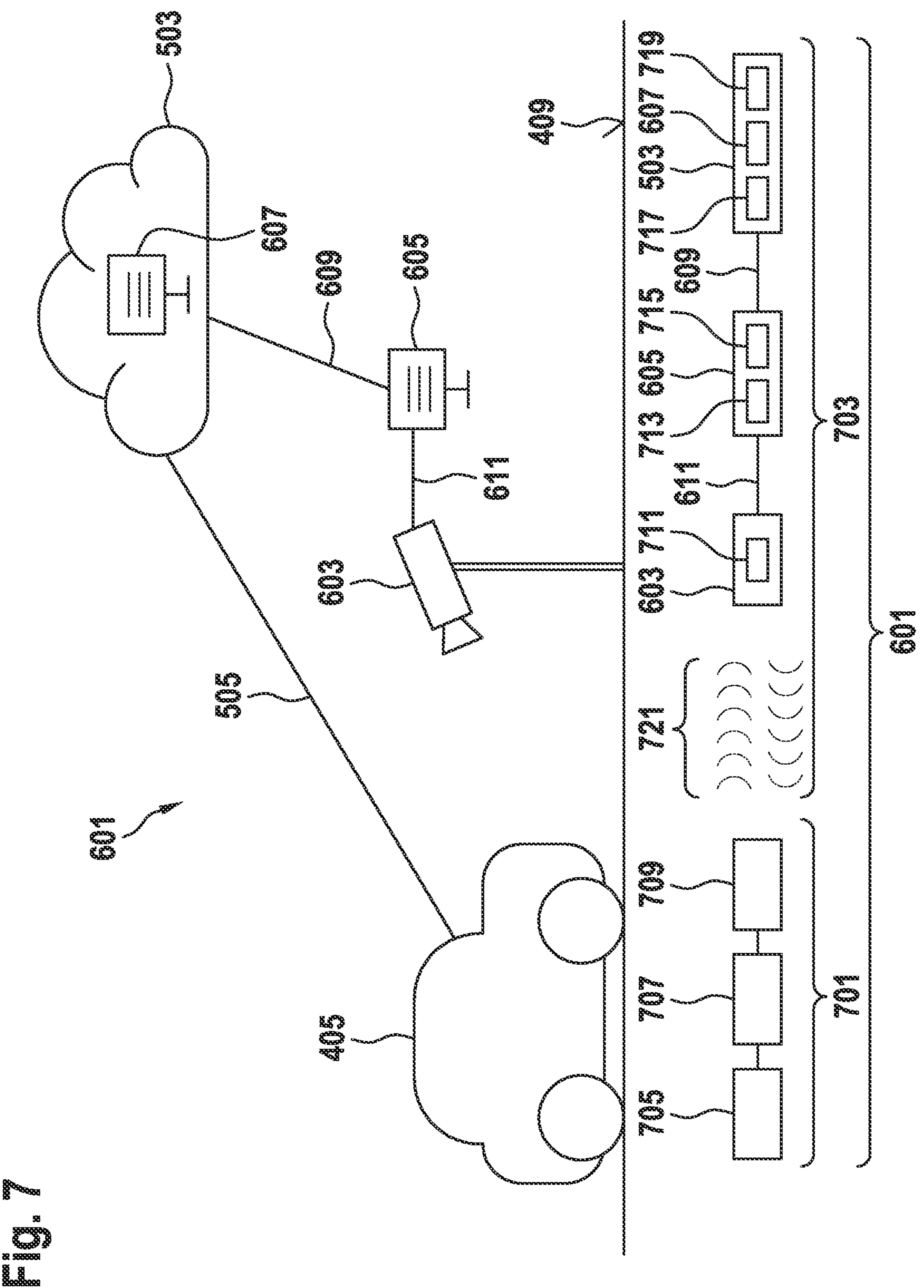
FIG. 7 shows the third event chain according to FIG. 6 in a more detailed view.

FIG. 7 shows the third event chain 601 in a further illustration.

For the sake of clarity, only solid connection lines are in part shown for the individual communication links between the components of the third event chain 601. The third event chain 601 comprises an on-board event chain 701 that comprises on-board components: a first component 705, a second component 707 and a third component 709. These components are, for example, the following: communication device, control unit, actuator and other components that can be used for an at least partly automated driving function of a motor vehicle, for example one or more environment sensors.

The third event chain 601 furthermore comprises an infrastructure event chain 703 that comprises the components on the infrastructure side. These are, for example, the cloud infrastructure 503, the video camera 603, the first computer 605 and the second computer 607 as well as the corresponding communication links.

A fifth communication link between the on-board event chain 701 and the infrastructure event chain 703 is marked by a curly bracket with reference sign 721. This communications link 721 is attributed to the infrastructure event chain 703.

The video camera 603 comprises an image sensor 711. Merely by way of example, the first computer 605 comprises further components 713, 715, for example a processor and a communication interface. The cloud infrastructure 503 comprises, by way of example, a communication interface 717, the second computer 607 and a database 719.

It is, for example, provided to determine for each of these components what safety integrity level the component has.

For example, it is determined that each of these components has an ASIL-C.

As the overall safety integrity level, the third event chain 601 then likewise has an ASIL-C.

It is furthermore determined which minimum safety integrity level the event chain 601 must have so that an infrastructure assistance datum, for example a video image of the video camera 603, may be used by the motor vehicle to carry out the at least partly automated driving function.

In the present case, it is, for example, determined that the minimum safety integrity level is likewise ASIL-C.

In such a case, i.e., if the minimum safety integrity level corresponds to the maximum safety integrity level of the event chain 601, the corresponding infrastructure assistance datum may be used for carrying out the at least partly automated driving function.

However, if, for example, it was determined that one of the components of the event chain 601 only has ASIL-B, the event chain 601 in total only has an ASIL-B, which in the present case is not sufficient for the at least partly automated driving function to be carried out using the corresponding infrastructure assistance datum. In such a case, it may, for example, be provided that the at least partly automated driving function is carried out with a restricted range of functions; for example, the motor vehicle drives slower compared to an unrestricted range of functions.

In summary, the concept described herein is based in particular on checking whether a signal/datum, i.e., an infrastructure assistance datum, of an infrastructure element may be used for a desired/defined action, i.e., carrying out the at least partly automated driving function.

The method may be used within a parking lot, a parking garage and/or on a road.

For example, communications between the motor vehicle and the infrastructure element may be carried out directly and/or indirectly via another infrastructure element and/or via a cloud infrastructure.

For example, the presence of one or more infrastructure elements is determined. It is thus determined that an infrastructure element is located in an environment of the motor vehicle, which infrastructure element is configured to determine an infrastructure assistance datum for an infrastructure-based, at least partly automated guidance of a motor vehicle, wherein the infrastructure element is part of an event chain for the at least partly automated guidance of a motor vehicle during a trip that is guided in an at least partly automated manner.

For example, this may be performed by one or more of the following actions:

Using a digital map and/or an external system (cloud/backend);

infrastructure transmits corresponding information regarding such an infrastructure element;

motor vehicle analyzes its environment by means of its own environment sensor system and detects such an infrastructure element based on the analysis.

It is, for example, determined what kind of infrastructure element it is and at what position this infrastructure element is located.

It is, for example, determined how to communicate with the infrastructure element, i.e., what communication technology is used and/or whether certificates need to be exchanged.

For example, a communication link is established between the motor vehicle and the infrastructure element.

It is, for example, determined which minimum requirements are placed on the entire event chain, which corresponds to the step of determining a minimum safety integrity level that the event chain must have for the infrastructure assistance datum of the infrastructure element to be used by the motor vehicle to carry out the at least partly automated driving function.

The minimum safety integrity level results, for example, from the at least partly automated driving task and a severity of the consequences.

EXAMPLES

Driving task: Searching for direction information to the nearest open parking spot in a parking lot, which has hardly any or no safety requirements so that the minimum safety integrity level may be correspondingly small.

Driving task: Searching for speed information on a (dynamic) traffic sign, which has high requirements since an unadjusted speed can result in accidents, so that the minimum safety integrity level must be correspondingly high.

Driving task: Searching for a condition, for example signal aspect, of a traffic light system, which has high requirements since driving through a red signal aspect can result in accidents, so that the minimum safety integrity level must be correspondingly high.

The severity of the action and thus the safety requirements are, for example, dependent on a variety of parameters/influencing variables (e.g., speed, braking characteristics, weather).

For example, it is determined which safety requirements the E2E event chain maximally fulfills. "E2E" stands for "end-to-end," i.e., an event chain comprising the on-board and the infrastructure event chain, which corresponds to the determination of which safety integrity level the event chain maximally fulfills.

That is to say, which requirements/specifications (availability, correctness, failure susceptibility, etc.) the individual parts (components, subcomponents, communication paths, etc.) and the overall event chain fulfill.

The analysis of whether and/or how the individual parts of an event chain can fulfill the requirement can, for example, be performed using the procedure described in ISO "Road Vehicles—Functional Safety—ISO 26262."

For example, the requirement is determined based on the at least partly automated driving function, e.g., ASIL-C must be present.

It is, for example, determined whether and/or how the entire event chain can fulfill this requirement. For this purpose, the individual parts of the event chain and the overall event chain are, for example, analyzed.

It is, for example, tested whether the maximum safety integrity level of the event chain is sufficient to carry out the at least partly automated driving function.

If, for example, a component in the event chain does not fulfill the requirements, e.g., is only ASIL-B, the requirements are not fulfilled, for example.

The data necessary for the corresponding determination are determined/provided by the motor vehicle, the infrastructure element, an infrastructure system and/or an additional external system (backend/cloud).

Due to the variety of motor vehicles and motor vehicle generations, infrastructure systems, infrastructure system generations, as well as many influencing variables (weather, temporary function failures, etc.), there are a variety of possibilities that can be checked prior to use.

Preferably, the possible combinations are analyzed in advance, and in advance, they are only compared and analyzed, for example, with respect to temporary influences.

If the maximum safety integrity level of the event chain is sufficient, a secure communication link is, for example, established between the motor vehicle and the infrastructure element, or an already established communication link is used, and the at least partly automated driving function is carried out based on the infrastructure assistance datum.

For example, the infrastructure assistance datum is additionally tested by the vehicle environment sensor system. For example, a video camera is used to test whether information indicated by a traffic sign and/or a signal aspect of a traffic light system corresponds to what the infrastructure assistance datum indicates.

If the maximum safety integrity level of the event chain is not sufficient, the driving function is not carried out or it is carried out according to a restricted range of functions, which may be different depending on the situation. For example, a crossing is traversed at a lower speed compared to an unrestricted range of functions.

In one embodiment, the motor vehicle (internal) and/or an external system tests in advance whether infrastructure assistance data of infrastructure elements may be used for carrying out the at least partly automated driving function, i.e., for example, for a planned, at least partly automated parking maneuver and/or the planned trip on the planned park grounds and/or the planned route. If this is not the case, alternative routes (i.e., for example, the parking spot on the left side of the grounds) are, for example, searched for on the grounds/route. If, for example, there is no (alternative) possibility of safely using the infrastructure assistance data of the infrastructure element(s) in the area and/or on the route, the driver/requester will be informed thereof, for example.

What is claimed is:

1. A method for carrying out a partly automated driving function by a motor vehicle, comprising the following steps:

determining that an infrastructure element is located in an environment of the motor vehicle, the infrastructure element being configured to determine an infrastructure assistance datum for an infrastructure-based, at least partly automated guidance of the motor vehicle, wherein the infrastructure element is part of an event chain for the at least partly automated guidance of the motor vehicle during a trip that is guided in an at least partly automated manner;

determining a minimum safety integrity level that the event chain must have for the infrastructure assistance datum of the infrastructure element to be used by the motor vehicle to carry out the at least partly automated driving function;

determining which safety integrity level the event chain maximally fulfills;

determining, based on the minimum safety integrity level and the maximum safety integrity level of the event chain, whether the at least partly automated driving function may be carried out based on the infrastructure assistance datum of the infrastructure element;

carrying out the at least partly automated driving function based on the infrastructure assistance datum and depending on a result of the determination as to whether the at least partly automated driving function may be carried out based on the infrastructure assistance datum of the infrastructure element, wherein the infrastructure element includes a video camera configured to capture an image of the environment of the motor vehicle and to generate the infrastructure assistance datum based on the captured image.

2. The method according to claim 1, wherein it is determined which respective safety integrity level each part of the event chain fulfills, wherein the maximum safety integrity level of the event chain is determined based on the respective safety integrity levels of the parts of the event chain.

3. The method according to claim 1, wherein vehicle-generated environmental signals representing an environment of the motor vehicle are received, wherein the infrastructure assistance datum is tested for correctness and/or for plausibility based on the vehicle-generated environmental signals, wherein the at least partly automated driving function is carried out based on a result of the test for correctness and/or plausibility.

4. The method according to claim 1, wherein the safety integrity level includes a SIL and/or an ASIL.

5. The method according to claim 1, wherein the at least partly automated driving function can be carried out according to a restricted range of functions and according to an unrestricted range of functions, wherein, depending on a result of the determination as to whether the at least partly automated driving function may be carried out based on the infrastructure assistance datum of the infrastructure element, the restricted or the unrestricted range of functions is selected so that the at least partly automated driving function is carried out according to the selected range of functions.

6. The method according to claim 1, wherein the at least partly automated driving function is an element selected from the following group of driving functions: emergency braking function, electronic stability program (ESP) function, anti-lock braking system (ABS) function, automatic valet parking (AVP) function.

7. The method according to claim 1, wherein the determination as to whether the at least partly automated driving function may be carried out based on the infrastructure assistance datum of the infrastructure element is performed depending at least one of on a current driving situation, on current weather, on a current time, on a current date, on a vehicle type of the motor vehicle, on an infrastructure type of the infrastructure or on the driving function.

8. The method according to claim 1, wherein the infrastructure element is an element selected from the following group of infrastructure elements: traffic light system, electronic traffic sign, dynamic traffic sign.

9. A device including a control unit and at least one communication interface, the device configured to:

determine that an infrastructure element is located in an environment of the motor vehicle, the infrastructure element being configured to determine an infrastructure assistance datum for an infrastructure-based, at least partly automated guidance of the motor vehicle, wherein the infrastructure element is part of an event chain for the at least partly automated guidance of the motor vehicle during a trip that is guided in an at least partly automated manner;

determine a minimum safety integrity level that the event chain must have for the infrastructure assistance datum of the infrastructure element to be used by the motor vehicle to carry out the at least partly automated driving function;

determine which safety integrity level the event chain maximally fulfills;

determine, based on the minimum safety integrity level and the maximum safety integrity level of the event chain, whether the at least partly automated driving function may be carried out based on the infrastructure assistance datum of the infrastructure element;

carry out the at least partly automated driving function based on the infrastructure assistance datum and depending on a result of the determination as to whether the at least partly automated driving function may be carried out based on the infrastructure assistance datum of the infrastructure element, wherein the infrastructure element includes a video camera configured to capture an image of the environment of the motor vehicle and to generate the infrastructure assistance datum based on the captured image.

10. A non-transitory machine-readable storage medium on which is stored a computer program for carrying out a partly automated driving function by a motor vehicle, the computer program, when executed by a computer, causing the computer to perform the following steps:

determining that an infrastructure element is located in an environment of the motor vehicle, the infrastructure element being configured to determine an infrastructure assistance datum for an infrastructure-based, at least partly automated guidance of the motor vehicle, wherein the infrastructure element is part of an event chain for the at least partly automated guidance of the motor vehicle during a trip that is guided in an at least partly automated manner;

determining a minimum safety integrity level that the event chain must have for the infrastructure assistance datum of the infrastructure element to be used by the motor vehicle to carry out the at least partly automated driving function;

determining which safety integrity level the event chain maximally fulfills;

determining, based on the minimum safety integrity level and the maximum safety integrity level of the event chain, whether the at least partly automated driving function may be carried out based on the infrastructure assistance datum of the infrastructure element;

carrying out the at least partly automated driving function based on the infrastructure assistance datum and depending on a result of the determination as to whether the at least partly automated driving function may be carried out based on the infrastructure assistance datum of the infrastructure element, wherein the infrastructure element includes a video camera configured to capture an image of the environment of the motor vehicle and to generate the infrastructure assistance datum based on the captured image.

* * * * *